United States Patent
Lin et al.

(10) Patent No.: US 8,462,201 B2
(45) Date of Patent: Jun. 11, 2013

(54) STEREOSCOPIC IMAGE DISPLAYING METHOD AND STEREOSCOPIC DISPLAY DEVICE THEREOF

(75) Inventors: Hsiang-Tan Lin, Keelung (TW);
Shih-Chieh Lin, Taipei County (TW);
Yue-Li Chao, Taoyuan County (TW);
Tzu-Chiang Shen, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 403 days.

(21) Appl. No.: 12/849,021

(22) Filed: Aug. 3, 2010

(65) Prior Publication Data

US 2011/0261173 A1    Oct. 27, 2011

(30) Foreign Application Priority Data

Apr. 22, 2010   (TW) .............................. 99112674 A (51) Int. Cl.
*H04N 13/04*    (2006.01)

(52) U.S. Cl.
USPC .......................................................... 348/57

(58) Field of Classification Search
USPC .......................................................... 348/57
See application file for complete search history.

(56) References Cited

U.S. PATENT DOCUMENTS

| 4,504,856 | A |   | 3/1985  | Jackman |   |
|---|---|---|---|---|---|
| 4,792,850 | A | * | 12/1988 | Liptoh et al. | 348/57 |
| 5,007,715 | A |   | 4/1991  | Verhulst |   |
| 5,264,964 | A |   | 11/1993 | Faris |   |
| 5,821,989 | A | * | 10/1998 | Lazzaro et al. | 348/56 |
| 5,875,055 | A | * | 2/1999  | Morishima et al. | 359/465 |
| 5,945,965 | A | * | 8/1999  | Inoguchi et al. | 345/6 |
| 5,991,073 | A | * | 11/1999 | Woodgate et al. | 359/462 |
| 6,046,849 | A | * | 4/2000  | Moseley et al. | 359/465 |
| 6,061,179 | A | * | 5/2000  | Inoguchi et al. | 359/464 |
| 6,252,624 | B1 | * | 6/2001 | Yuasa et al. | 348/56 |
| 6,975,345 | B1 | * | 12/2005 | Lipton et al. | 348/57 |
| 7,190,518 | B1 | * | 3/2007 | Kleinberger et al. | 359/465 |
| 7,724,211 | B2 | * | 5/2010 | Slavenburg et al. | 345/8 |
| 8,274,448 | B1 | * | 9/2012 | Cook | 345/9 |
| 2001/0043266 | A1 | * | 11/2001 | Robinson et al. | 348/53 |
| 2002/0001128 | A1 | * | 1/2002 | Moseley et al. | 359/465 |
| 2006/0098281 | A1 | * | 5/2006 | Fukushima et al. | 359/464 |
| 2006/0114415 | A1 | * | 6/2006 | Shestak et al. | 353/7 |
| 2006/0152812 | A1 | * | 7/2006 | Woodgate et al. | 359/619 |
| 2006/0192746 | A1 | * | 8/2006 | Ioki et al. | 345/102 |
| 2006/0203338 | A1 | * | 9/2006 | Pezzaniti | 359/465 |
| 2006/0227420 | A1 | * | 10/2006 | Cha et al. | 359/465 |

(Continued)

FOREIGN PATENT DOCUMENTS

| CN | 101408679 A | 4/2009 |
|---|---|---|
| TW | I276836 | 3/2007 |
| WO | WO 2009069026 A2 * | 6/2009 |

*Primary Examiner* — Sath V Perungavoor
*Assistant Examiner* — Peter D Le
(74) *Attorney, Agent, or Firm* — Winston Hsu; Scott Margo (57) ABSTRACT

A stereoscopic image displaying method and a stereoscopic display device thereof is provided. The stereoscopic image displaying method includes a data providing step, a polarization adjusting step, and a backlight controlling step. The stereoscopic display device includes a display panel, a light modulation device, and a backlight module which are respectively configured to perform the data providing step, the polarization adjusting step, and the backlight controlling step. In the backlight controlling step, the time of turn-on and turn-off is adjusted. Alternatively, in the data providing step, black-image data is added.

18 Claims, 6 Drawing Sheets

U.S. PATENT DOCUMENTS

| | | | |
|---|---|---|---|
| 2007/0165304 A1* | 7/2007 | Tomita | 359/464 |
| 2007/0229395 A1* | 10/2007 | Slavenburg et al. | 345/8 |
| 2007/0229487 A1* | 10/2007 | Slavenburg et al. | 345/213 |
| 2007/0229951 A1* | 10/2007 | Jung et al. | 359/465 |
| 2008/0204874 A1* | 8/2008 | Kim et al. | 359/465 |
| 2008/0238863 A1* | 10/2008 | Nishigaki | 345/102 |
| 2008/0246897 A1* | 10/2008 | Gaudreau | 349/15 |
| 2008/0316596 A1* | 12/2008 | Cha et al. | 359/463 |
| 2009/0103178 A1* | 4/2009 | Woodgate et al. | 359/465 |
| 2009/0179850 A1* | 7/2009 | Chen et al. | 345/102 |
| 2009/0237495 A1* | 9/2009 | Kawahara | 348/56 |
| 2010/0026792 A1* | 2/2010 | Niyomura et al. | 348/54 |
| 2010/0033557 A1* | 2/2010 | Abe et al. | 348/58 |
| 2010/0045640 A1* | 2/2010 | Park et al. | 345/205 |
| 2010/0066927 A1* | 3/2010 | Chang | 349/15 |
| 2010/0289883 A1* | 11/2010 | Goris et al. | 348/56 |
| 2011/0032346 A1* | 2/2011 | Kleinberger | 348/59 |
| 2011/0063424 A1* | 3/2011 | Matsuhiro et al. | 348/58 |
| 2011/0157332 A1* | 6/2011 | Kim et al. | 348/56 |

\* cited by examiner

STEREOSCOPIC IMAGE DISPLAYING METHOD AND STEREOSCOPIC DISPLAY DEVICE THEREOF

BACKGROUND OF THE INVENTION

1. Field of the Invention

The present invention relates to a stereoscopic image displaying method and a stereoscopic display device thereof, more particularly, to a stereoscopic image displaying method for reducing the crosstalk of left eye image and right eye image and a stereoscopic display device thereof.

2. Description of the Prior Art

Stereoscopic image displaying methods may be mainly categorized into two groups: time-sequential stereoscopic image displaying method and spatial stereoscopic image displaying method. In the time-sequential stereoscopic image displaying method, projectors are widely utilized. For example, as described in U.S. Pat. No. 4,504,856, two projectors offer the stereoscopic image by alternately providing the left eye image and the right eye image. The volume of conventional projectors, however, is overlarge, which increases complexity in designing optical elements and driving circuits of the projectors, and further raises the production cost. On the other hand, the spatial stereoscopic image displaying method suffers from low resolution. For example, as described in U.S. Pat. Nos. 5,007,715 or 5,264,964, the display panel provides the left eye image and the right eye image at the same time. With the aid of a pair of polarization glasses, the left eye image is received by the left eye of the observer and the right eye image is received by the right eye of the observer. Because the display panel shows two sets of images at one time, in some cases the resolution will drop to 50%, causing the disadvantage of low-resolution.

Figure 1:
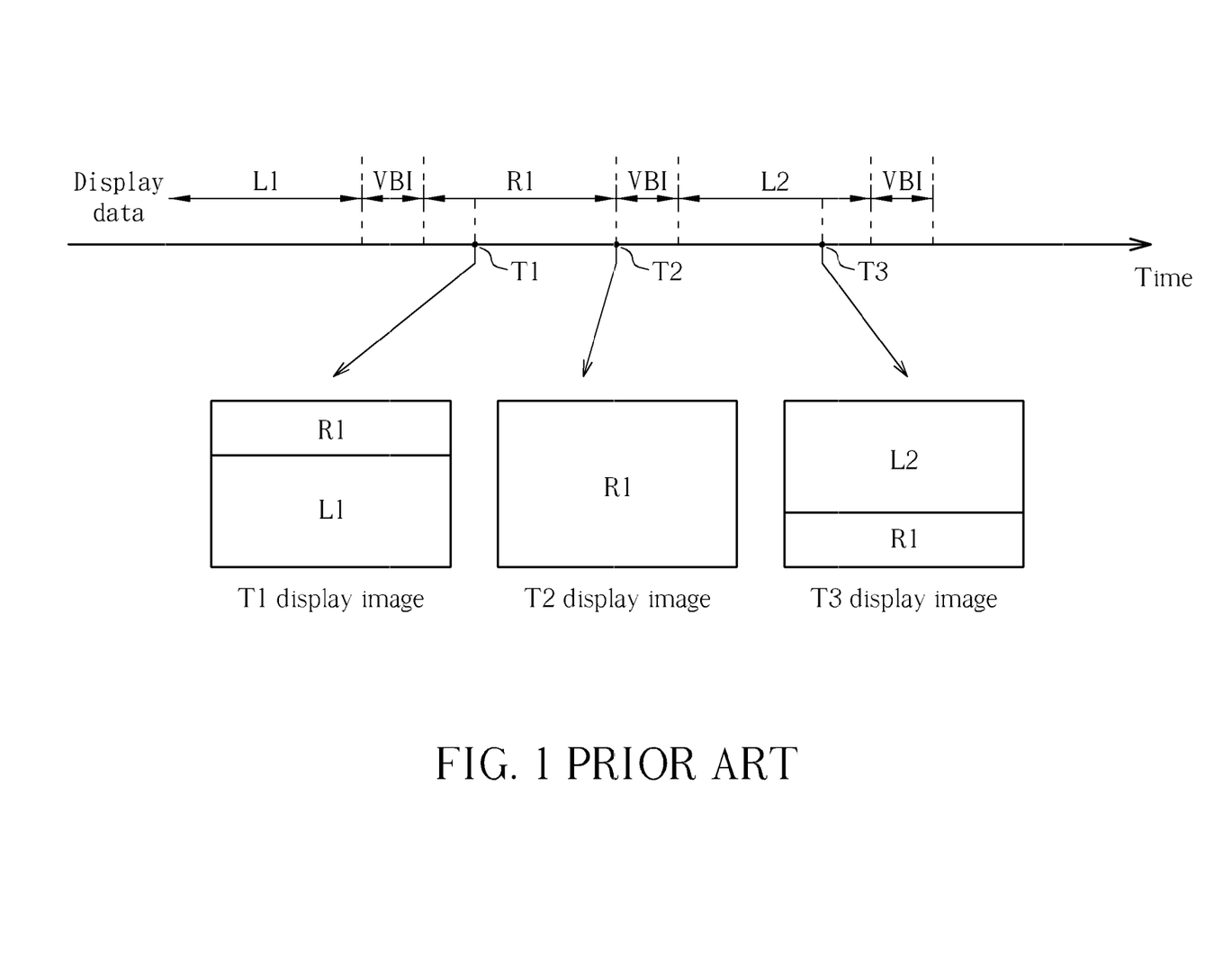
FIG. 1 is a schematic diagram illustrating the operation of the stereoscopic display device in the prior art.

In addition, the polarization glasses may be utilized in the time-sequential stereoscopic image displaying method which alternately provides the left eye image and the right eye image in a time sequence. Please refer to FIG. 1. FIG. 1 is a schematic diagram illustrating the operation of the stereoscopic display device in the prior art. As shown in FIG. 1, a first left eye data L1, a vertical blanking interval VBI, a first right eye data R1, a vertical blanking interval VBI, and a second left eye data L2 are sequentially provided. With the aid of the polarization glasses, the first left eye data L1 and the second left eye data L2 are received by the left eye of the observer, and the first right eye data R1 is received by the right eye of the observer. For example, when time is T2, the whole frame is the required display image (i.e. the first right eye data R1). However, the display data are displayed on the frame by scanning, such as by sequentially scanning from top to bottom in FIG. 1. Accordingly, only a portion of the whole frame may show the required display image at a certain time, and the observer can not receive the complete and correct image. For instance, when time is T1, the right eye of the observer may receive a portion of the first right eye data R1 and a portion of the first left eye data L1 at the same time; when time is T3, the left eye of the observer may receive a portion of the second left eye data L2 and a portion of the first right eye data R1 at the same time. As a result, each eye of the observer may receive both of the left eye data and the right eye data within a period of time, and the quality of the display images may be deteriorated due to the crosstalk of the left eye image and the right eye image.

SUMMARY OF THE INVENTION

It is therefore one of the objectives of the present invention to provide a stereoscopic image displaying method and a stereoscopic display device thereof to overcome the limitation and disadvantage in the prior art.

According to a first preferred embodiment of the present invention, a stereoscopic image displaying method is provided for sequentially displaying a plurality of display images. A cycle of each of the display images sequentially includes a first time period, a first vertical blanking interval, a second time period, and a second vertical blanking interval. The stereoscopic image displaying method includes the following steps. First, a data providing step is performed to provide a first image data to display a first image in the first time period by scanning, to maintain the first image in the first vertical blanking interval by maintaining the first image data, to provide a second image data to display a second image in the second time period by scanning, and to maintain the second image in the second vertical blanking interval by maintaining the second image data. Subsequently, a polarization adjusting step is performed to render the first image to have a first polarization state in the first time period and in the first vertical blanking interval, and to render the second image to have a second polarization state in the second time period and in the second vertical blanking interval. Following that, a backlight controlling step is performed to provide a first backlight mode in a period of time within the first time period which starts from a beginning of the first time period and in a period of time within the second time period which starts from a beginning of the second time period, and to provide a second backlight mode in a remaining of the period of time within the first time period, in the first vertical blanking interval, in a remaining of the period of time within the second time period, and in the second vertical blanking interval, wherein a brightness of the second backlight mode is more than a brightness of the first backlight mode.

According to the first preferred embodiment of the present invention, a stereoscopic display device is also provided. The stereoscopic display device includes a display panel, a light modulation device, and a backlight module. The display panel has a light-exiting plane and a light-incident plane, and the display panel is configured to perform the aforementioned data providing step of the first preferred embodiment. The light modulation device is disposed at a side of the light-exiting plane of the display panel, and the light modulation device is configured to perform the aforementioned polarization adjusting step of the first preferred embodiment. Moreover, the light modulation device is disposed at a side of the light-exiting plane of the display panel, and the light modulation device is configured to perform the aforementioned backlight controlling step of the first preferred embodiment.

According to a second preferred embodiment of the present invention, a stereoscopic image displaying method is provided for sequentially displaying a plurality of display images. A cycle of each of the display images sequentially includes a first time period, a first black-image time period, a second time period, and a second black-image time period. The stereoscopic image displaying method includes the following steps. First, a data providing step is performed to provide a first image data to display a first image in the first time period by scanning, to provide a first black-image data to display a first black-image in the first black-image time period by scanning, to provide a second image data to display a second image in the second time period by scanning, and to provide a second black-image data to display a second black-image in the second black-image time period by scanning. Then, a polarization adjusting step is performed to render the first image and the first black-image to have a first polarization state in the first time period and in the first black-image time period, and to render the second image and the second black-image to have a second polarization state in the second time period and in the second black-image time period.

According to the second preferred embodiment of the present invention, a stereoscopic display device is also provided. The stereoscopic display device includes a display panel and a light modulation device. The display panel has a light-exiting plane and a light-incident plane, and the display panel is configured to perform the aforementioned data providing step of the second preferred embodiment. In addition, the light modulation device is disposed at a side of the light-exiting plane of the display panel, and the light modulation device is configured to perform the aforementioned polarization adjusting step of the second preferred embodiment.

In the stereoscopic image displaying method of the present invention and the stereoscopic display device thereof, the first backlight mode and the second backlight mode are alternately provided to reduce the crosstalk of the left eye image and the right eye image. Furthermore, the present invention is capable of decreasing the power consumption of the backlight module in order to save energy. Moreover, the present invention is capable of avoiding the crosstalk of the left eye image and the right eye image by inserting the black-image data between the left eye image data and the right eye image data. Also, since the liquid crystal molecules are transited from the state of the black-image to the state of the grayscale image, the present invention does not need additional memory devices to perform the over-driving method. Thus, the product cost of the stereoscopic display device is reduced in the present invention.

These and other objectives of the present invention will no doubt become obvious to those of ordinary skill in the art after reading the following detailed description of the preferred embodiment that is illustrated in the various figures and drawings.

DETAILED DESCRIPTION

In the following specifications and claims, certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to". In addition, it should be noted that the diagrams are for explanations and are not drawn as original sizes or to scale.

Figure 2:
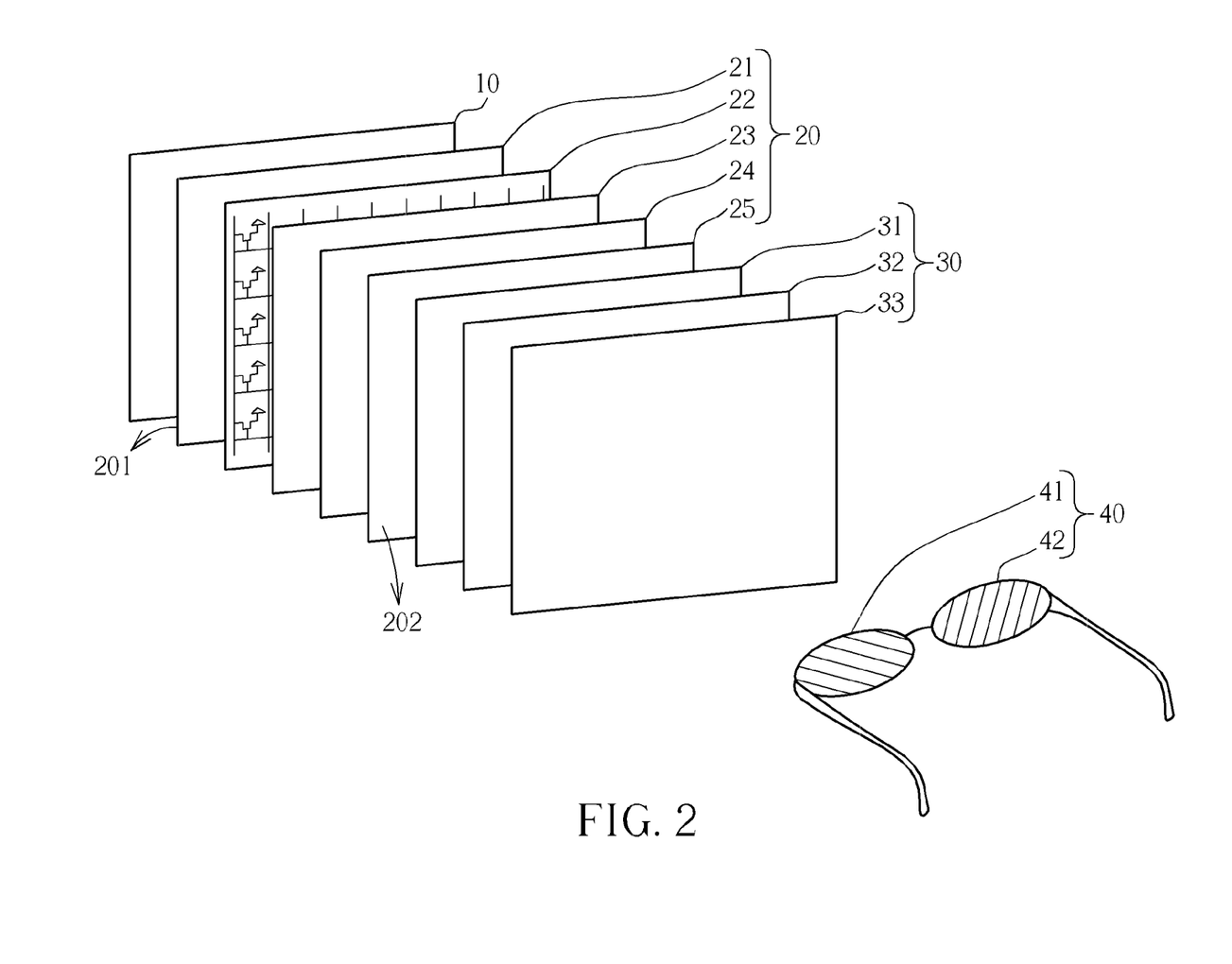
FIG. 2 is a schematic diagram illustrating the structure of the stereoscopic display device according to a first preferred embodiment of the present invention.

Please refer to FIG. 2. FIG. 2 is a schematic diagram illustrating the structure of the stereoscopic display device according to a first preferred embodiment of the present invention. As shown in FIG. 2, the stereoscopic display device of the present preferred embodiment includes a backlight module 10, a display panel 20, and a light modulation device 30. The display panel 20 has a light-exiting plane 202 and a light-incident plane 201. The light modulation device 30 is disposed at a side of the light-exiting plane 202 of the display panel 20, and the backlight module 10 is disposed at a side of the light-incident plane 201 of the display panel 20. In the present preferred embodiment, the display panel 20 is a liquid crystal display (LCD) panel which is configured to alternately provide a first image data (e.g. the left eye data) and a second image data (e.g. the right eye data). The display panel 20 includes a first polarization film 21 and a second polarization film 25. The first polarization film 21 is adjacent to the backlight module 10, and the second polarization film 25 is adjacent to the light modulation device 30. In addition, the polarization direction of the first polarization film 21 may be orthogonal or parallel to the polarization direction of the second polarization film 25 according to different kinds of LCD displaying modes. For instance, in the first preferred embodiment, the first polarization film 21 is a 135° linear polarization film, and the second polarization film 25 is a 45° linear polarization film. The display panel 20 further includes a thin film transistor array substrate 22, a liquid crystal layer 23, and a color filter substrate 24. The thin film transistor array substrate 22 and the color filter substrate 24 are disposed opposite to each other, and the liquid crystal layer 23 is disposed between the thin film transistor array substrate 22 and the color filter substrate 24. However, the display panel 20 of the present invention is not limited to a LCD panel, but could be any kinds of display panels. For example, the display panel of the present invention may be a display panel (not shown in the figure) that has a polarization film (not shown in the figure) and update image by scanning, such as a plasma display panel, an electroluminescence panel or a cathode ray tube display panel.

Please refer to FIG. 2. In the first preferred embodiment, the light modulation device 30 is a liquid crystal type light modulation device that includes a first transparent substrate 31, a liquid crystal layer 32, and a second transparent substrate 33. The first transparent substrate 31 and the second transparent substrate 33 are disposed opposite to each other, and the liquid crystal layer 32 is disposed between the first transparent substrate 31 and the second transparent substrate 33. The first transparent substrate 31 and the second transparent substrate 33 may be made of rigid transparent materials, but also can made of other soft or flexible materials such as glass, quartz or plastics. Furthermore, the liquid crystal molecules in the liquid crystal layer 32 are twisted nematic (TN) liquid crystal molecules, but are not limited herein. Moreover, the stereoscopic display device of the present invention further includes a pair of polarization glasses 40 which have a first polarization lens 41 and a second polarization lens 42. The first polarization lens 41 allows transmission of the first image in the first polarization state and blocks transmission of the second image in the second polarization state, and the second polarization lens 42 allows transmission of the second image in the second polarization state and blocks transmission of the first image in the first polarization state. In the present preferred embodiment, the first polarization lens 41 is a 45° linear polarization film, and the second polarization lens is a 135° linear polarization film. Accordingly, when viewing the stereoscopic display device, the polarization glasses 40 enable the right eye of the observer and the left eye of the observer to respectively catch the first display information and the second information in order to achieve the effect of stereoscopic display.

Figure 3:
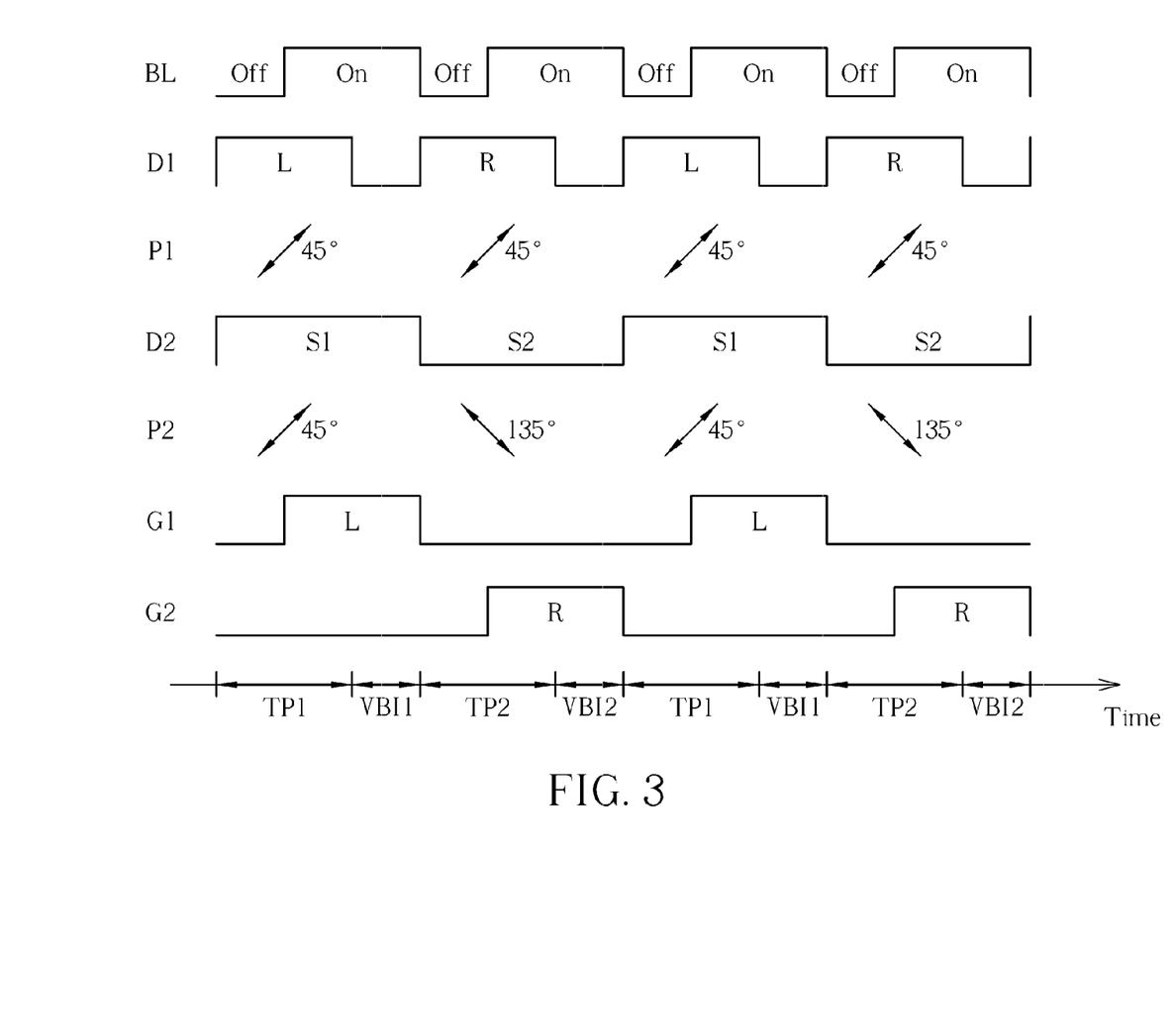
FIG. 3 is a timing diagram illustrating the stereoscopic image displaying method according to the first preferred embodiment of the present invention.

Please refer to FIG. 2 and FIG. 3. FIG. 3 is a timing diagram illustrating the stereoscopic image displaying method according to the first preferred embodiment of the present invention. As shown in FIG. 3, the stereoscopic image displaying method of the present preferred embodiment is for sequentially displaying a plurality of display images. Each display image may include a left eye display image and a right eye display image to constitute a stereoscopic image. Furthermore, a cycle of each of the display images sequentially includes a first time period TP1, a first vertical blanking interval VBI1, a second time period TP2, and a second vertical blanking interval VBI2. The stereoscopic image displaying method includes the following steps:

1. A data providing step is performed: A display signal source D1 is utilized to provide signals to the display panel 20. As shown in FIG. 3, a first image data L is provided to display a first image in the first time period TP1 by scanning, and the first image data L is maintained to maintain the first image in the first vertical blanking interval VBI1. Then, a second image data R is provided to display a second image in the second time period TP2, and the second image data R is maintained to maintain the second image in the second vertical blanking interval VBI2. In other words, within the first vertical blanking interval VBI1 and the second vertical blanking interval VBI2, no signal is transmitted from the display signal source D1 to the display panel 20, so that the display panel 20 keeps the image data (e.g. the first image data L) provided at the time before the vertical blanking interval (e.g. the first vertical blanking interval VBI1). In the present preferred embodiment, the first image data L serve as a left eye signal, and the second image data R serves as a right eye signal, but are not limited herein. The frequency of alternately providing the first image data L and the second image data R to the display panel 20 is more than or equal to 120 Hz. Thus, the image replacement frequency for each of the left eye and the right eye of the observer is more than or equal to 60 Hz, and the problem of flicker may be avoided. In addition, since the second polarization film 25 of the present preferred embodiment is the 45° linear polarization film, the polarization direction of the light output P1 of the display panel 20 is 45°, as shown in FIG. 3.

2. A polarization adjusting step is performed: A modulation signal source D2 is utilized to provide signals to the light modulation device 30. As shown in FIG. 3, the first modulation signal S1 and the second modulation signal S2 of the modulation signal source D2 respectively render the first image to have a first polarization state in the first time period TP1 and in the first vertical blanking interval VBI1, and render the second image to have a second polarization state in the second time period TP2 and in the second vertical blanking interval VBI2. The polarization direction in the first polarization state is orthogonal to the polarization direction in the second polarization state, but it is not limited herein. Moreover, in the present preferred embodiment, the light modulation device 30 is a TN typed panel. When the modulation signal source D2 of the light modulation device 30 is the first modulation signal S1, both of the light output P2 of the light modulation device 30 and the light output P1 of the display panel 20 have the polarization direction of 45°. On the other hand, when the modulation signal source D2 of the light modulation device 30 is the second modulation signal S2, the polarization direction of the light output P2 of the light modulation device 30 is orthogonal to the polarization direction of the light output P1 of the display panel 20. That is, the polarization direction of the light output P2 of the light modulation device 30 is altered to 135°.

3. A backlight controlling step is performed: A backlight signal source BL is utilized to provide signals to the backlight module 10. As shown in FIG. 3, a first backlight mode is provided in a period of time within the first time period TP1 which starts from a beginning of the first time period TP1 and in a period of time within the second time period TP2 which starts from a beginning of the second time period TP2. Also, a second backlight mode is provided in a remaining of the period of time within the first time period TP1, in the first vertical blanking interval VBI1, in a remaining of the period of time within the second time period TP2, and in the second vertical blanking interval VBI2, wherein a brightness of the second backlight mode is more than a brightness of the first backlight mode. In the present preferred embodiment, the first backlight mode is to turn off the backlight module and the second backlight mode is to turn on the backlight module. But it is not limited herein. For instance, the brightness ratio of the second backlight mode to the first backlight mode may be adjusted. It should be noted that the second backlight mode of the present preferred embodiment may be provided only within the first vertical blanking interval VBI1 and within the second vertical blanking interval VBI2, and the first backlight mode is provided in the remaining of the aforementioned time period.

Moreover, as shown in FIG. 3, G1 is the image passing through the first polarization lens 41 of the polarization glasses 40. Since the first polarization lens 41 is the 45° linear polarization film, only the light output with the polarization direction of 45° is received to serve as the left eye image. In the same way, as shown in FIG. 3, G2 is the image passing the second polarization lens 42 of the polarization glasses 40. Since the second polarization lens 42 is the 135° linear polarization film, only the light output with the polarization direction of 135° is received to serve as the right eye image.

The backlight module 10 is turned off in a period of time by the backlight controlling step of the first preferred embodiment, so that the crosstalk occurring in the transition process of the liquid crystal molecules may not be received by the observer. For example, when the display panel 20 scans the first image data L to replace the second image data R in the first time period TP1, the backlight module 10 is turned off in a period of time within the first time period TP1 which starts from the beginning of the first time period TP1. In other words, the image frame, in which a small region of the display panel 20 shows the first image data L but most of the region contains the second image data R, could be prevented from being received by the observer, so that the crosstalk of the left eye image and the right eye image may be reduced. Moreover, the power consumption of the backlight module may be effectively decreased to save the energy by suitably turning off the backlight module. It should be noted that by adjusting the brightness ratio of the second backlight mode to the first backlight mode without turning off the backlight module, the brightness of the second backlight mode may be more than the brightness of the first backlight mode and the effect of reducing the crosstalk and saving the energy may be achieved.

Figure 4:
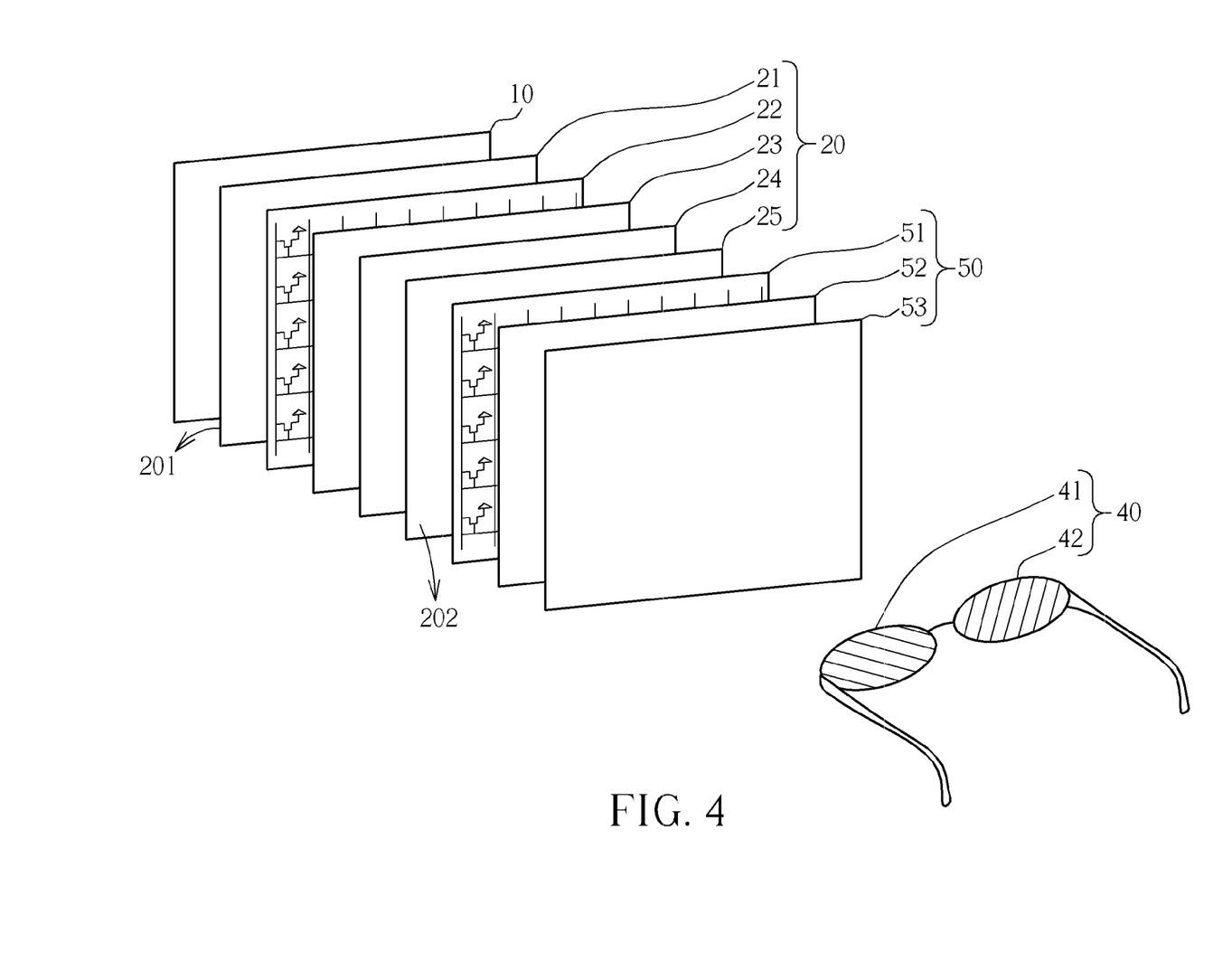
FIG. 4 is a schematic diagram illustrating the structure of the stereoscopic display device according to a second preferred embodiment of the present invention.

To simplify the description and for the convenience of comparison between two embodiments of the present invention, identical elements are denoted by identical numerals. Please refer to FIG. 4. FIG. 4 is a schematic diagram illustrating the structure of the stereoscopic display device according to a second preferred embodiment of the present invention. The major difference between the stereoscopic display device of the second preferred embodiment and the stereoscopic display device of the first preferred embodiment is the light modulation device. As shown in FIG. 4, the light modulation device 50 of the second preferred embodiment is a liquid crystal type light modulation device, which includes a thin film transistor array substrate 51, a liquid crystal layer 52, and a transparent substrate 53. The thin film transistor array substrate 51 and the transparent substrate 53 are disposed opposite to each other, and the liquid crystal layer 52 is disposed between the thin film transistor array substrate 51 and the transparent substrate 53. In other words, the light modulation device 50 of the second preferred embodiment includes the thin film transistor array substrate 51, so that the light modulation device 50 is capable of sequentially scanning in accompaniment with the display panel 20.

Figure 5:
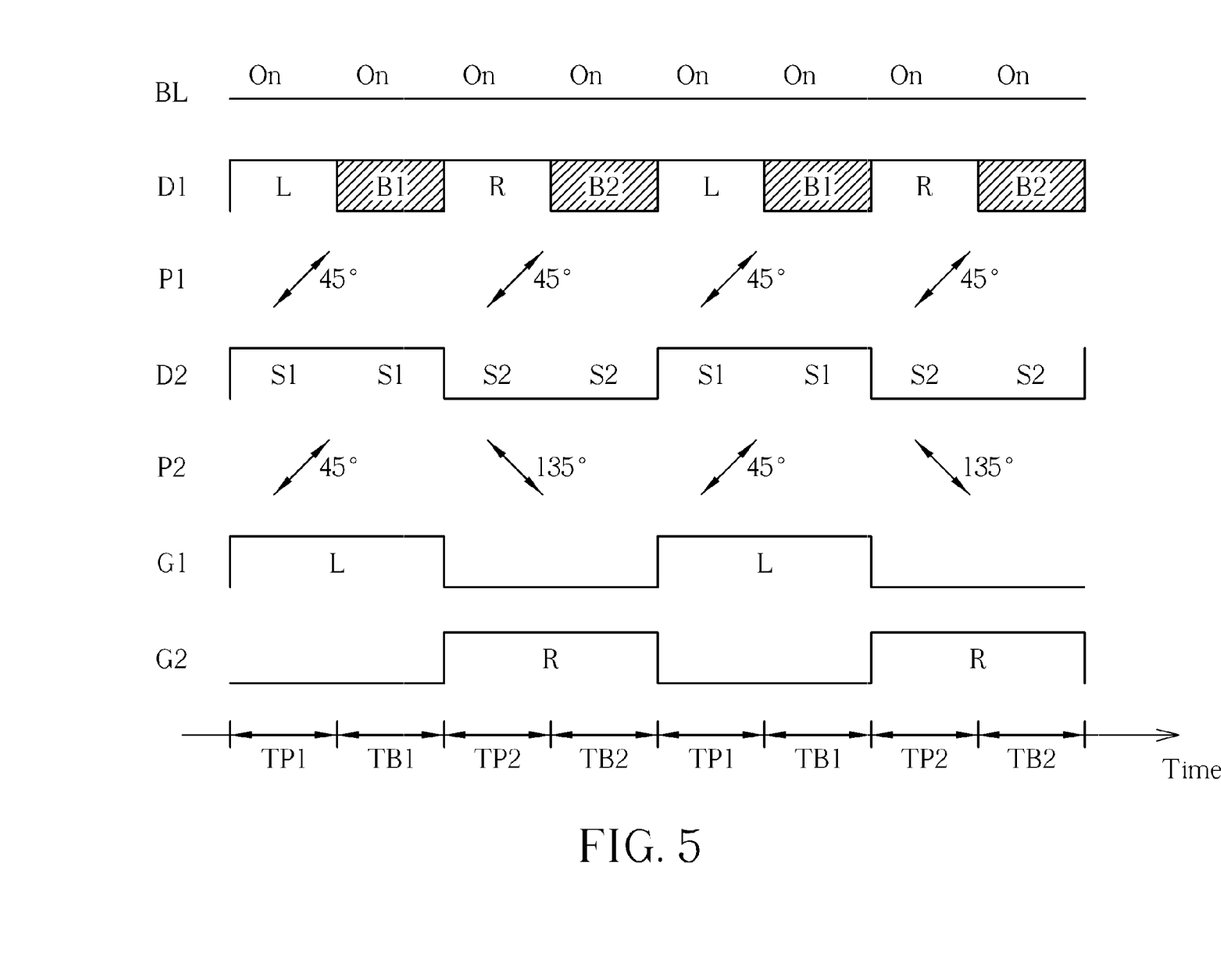
FIG. 5 is a timing diagram illustrating the stereoscopic image displaying method according to the second preferred embodiment of the present invention.

Please refer to FIG. 4 and FIG. 5. FIG. 5 is a timing diagram illustrating the stereoscopic image displaying method according to the second preferred embodiment of the present invention. As shown in FIG. 5, the stereoscopic image displaying method of the present preferred embodiment is provided for sequentially displaying a plurality of display images. A cycle of each of the display images sequentially includes a first time period TP1, a first black-image time period TB1, a second time period TP2, and a second black-image time period TB2. It should be noted that in the present preferred embodiment, the duration of the first time period TP1, the duration of the first black-image time period TB1, the duration of the second time period TP2, and the duration of the second black-image time period TB2 are the same. But it is not limited herein and the ratio of durations may be altered. The stereoscopic image displaying method includes the following steps:

1. A data providing step is performed: A display signal source D1 is utilized to provide signals to the display panel 20. As shown in FIG. 5, a first image data L is provided to display a first image in the first time period TP1 by scanning, and a first black-image data B1 is provided to display a first black-image in the first black-image data B1. Then, a second image data R is provided to display a second image in the second time period TP2, and a second black-image data B2 is provided to display a second black-image in the second black-image time period TB2. In other words, the first black-image data B1 is inserted after the first image data L, and the second black-image data B2 is inserted after the second image data R. In the present preferred embodiment, the first image data L serve as a left eye signal, and the second image data R serves as a right eye signal, but are not limited herein. The frequency of alternately providing the first image data L, the first black-image data B1, the second image data R, and the second black-image data B2 to the display panel 20 is more than or equal to 240 Hz. Thus, the image replacement frequency for each of the left eye and the right eye of the observer is more than or equal to 60 Hz, and the problem of flicker may be avoided. The polarization direction of light output P1 of the display panel 20 is the same as that of the first preferred embodiment, and repeated descriptions are not redundantly given.

2. A polarization adjusting step is performed: A modulation signal source D2 is utilized to provide signals to the light modulation device 30. As shown in FIG. 5, the first modulation signal S1 and the second modulation signal S2 of the modulation signal source D2 respectively render the first image and the first black-image to have a first polarization state in the first time period TP1 and in the first black-image time period TB1, and render the second image and the second black-image to have a second polarization state in the second time period TP2 and in the second black-image time period TB2. The polarization direction in the first polarization state is orthogonal to the polarization direction in the second polarization state, but it is not limited herein. In addition, the illustration about the light output P2 of the light modulation device 50 is similar to that of the first preferred embodiment, and repeated descriptions are not redundantly given.

As shown in FIG. 5, the backlight module 10 is turned on in all of the first time period TP1, the first black-image time period TB1, the second time period TP2, and the second black-image time period TB1. But it is not limited herein, and the backlight mode within each period of time may be adjusted. In addition, as shown in FIG. 5, G1 and G2 are images respectively passing through the first polarization lens 41 and the second polarization lens 42 of the polarization glasses 40.

As a result, the second preferred embodiment of the present invention is capable of avoiding the crosstalk of the first image and the second image by inserting the black-image data between the first image data L and the second image data R. Since the liquid crystal molecules are transited from the state of the black-image to the state of the grayscale image, the present invention does not need additional memory devices to perform the over-driving method. Thus, the product cost of the stereoscopic display device is capable of being reduced in the present invention.

Figure 6:
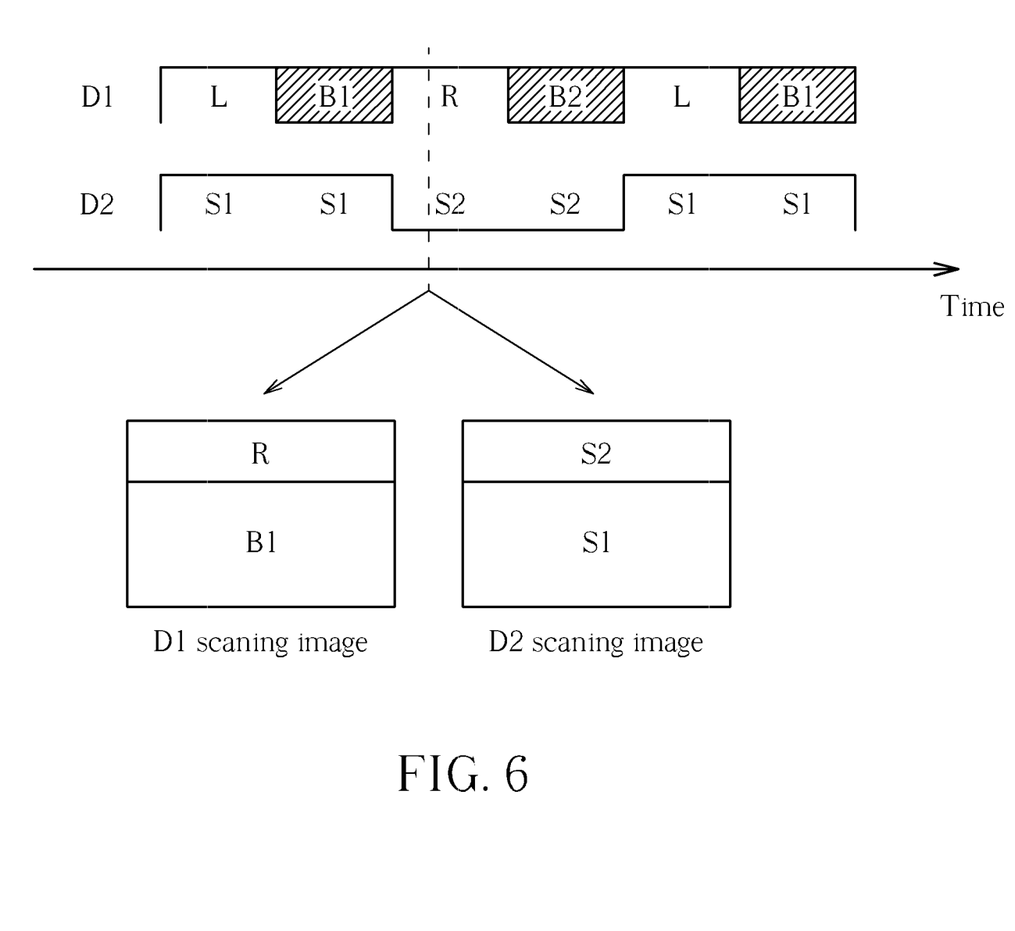
FIG. 6 is a schematic diagram illustrating the image-scanning of the stereoscopic image displaying method according to a second preferred embodiment of the present invention.

It should be noted that in the present preferred embodiment, the polarization adjusting step and the data providing step are performed by scanning synchronously. Please refer to FIG. 6. FIG. 6 is a schematic diagram illustrating the image-scanning of the stereoscopic image displaying method according to a second preferred embodiment of the present invention. As shown in FIG. 6, at the time as labeled by a dotted line of FIG. 6, the second image data R is transmitted to the display panel 10 from the display signal source D1 by scanning, and the second modulation signal S2 is also transmitted to the light modulation device 50 from the modulation signal source D2 by scanning synchronously. Accordingly, by transmitting the second modulation signal S2 to the light modulation device 50, the second image data R, which serves as the left eye image and shows in a region of the display panel 20, has the second polarization state. On the other hand, since the rest of the aforementioned region in the display panel 20 is not the left eye image, the corresponding region in the light modulation device 50 maintains the first modulation signal S1. The light modulation device 50 is scanning synchronously with the display panel 10 in the present preferred embodiment, so that the first image in the frame has the first polarization state and the second image in the frame has the second polarization state. As a result, the crosstalk of the left eye image and the right eye image in different regions is reduced for improving the quality of the display images.

In summary, by alternately providing the first backlight mode and the second backlight mode or by adjusting the time of turn-on and turn-off in the backlight controlling step, the stereoscopic image displaying method of the present invention and the stereoscopic display device thereof are capable of reducing the crosstalk of the left eye image and the right eye image. Furthermore, the present invention is capable of decreasing the power consumption of the backlight module in order to save the energy. Moreover, the present invention is capable of avoiding the crosstalk of the left eye image and the right eye image by inserting the black-image data between the left eye image data and the right eye image data. Also, since the liquid crystal molecules are transited from the state of the black-image to the state of the grayscale image, the present invention does not need additional memory devices to perform the over-driving method. Thus, the product cost of the stereoscopic display device is reduced in the present invention.

Those skilled in the art will readily observe that numerous modifications and alterations of the device and method may be made while retaining the teachings of the invention.

What is claimed is:

1. A stereoscopic image displaying method, for sequentially displaying a plurality of display images, a cycle of each of the display images sequentially comprising a first time period, a first vertical blanking interval, a second time period, and a second vertical blanking interval, the stereoscopic image displaying method comprising: performing a data providing step to provide a first image data to display a first image in the first time period by scanning, to maintain the first image in the first vertical blanking interval by maintaining the first image data, to provide a second image data to display a second image in the second time period by scanning, and to maintain the second image in the second vertical blanking interval by maintaining the second image data; performing a polarization adjusting step to render the first image to have a first polarization state in the first time period and in the first vertical blanking interval, and to render the second image to have a second polarization state in the second time period and in the second vertical blanking interval; and performing a backlight controlling step to provide a first backlight mode in a period of time within the first time period which starts from a beginning of the first time period and in a period of time within the second time period which starts from a beginning of the second time period, and to provide a second backlight mode in a remaining period of time within the first time period, in the first vertical blanking interval, in a remaining period of time within the second time period, and in the second vertical blanking interval, wherein a brightness of the second backlight mode is greater than a brightness of the first backlight mode, wherein the data providing step displays the first image and the second image on a display panel, the polarization adjusting step is performed with a light modulation device, and the light modulation device is disposed in front of the display panel.

2. The stereoscopic image displaying method of claim 1, wherein the first backlight mode is a backlight turn-off mode and the second backlight mode is a backlight turn-on mode.

3. The stereoscopic image displaying method of claim 1, wherein a polarization direction in the first polarization state is orthogonal to a polarization direction in the second polarization state.

4. The stereoscopic image displaying method of claim 1, further comprising observing the first image and the second image with an aid of a pair of polarization glasses which includes a first polarization lens and a second polarization lens, wherein the first polarization lens allows transmission of the first image in the first polarization state and blocks transmission of the second image in the second polarization state, and the second polarization lens allows transmission of the second image in the second polarization state and blocks transmission of the first image in the first polarization state.

5. A stereoscopic image displaying method, for sequentially displaying a plurality of display images, a cycle of each of the display images sequentially comprising a first time period, a first black-image time period, a second time period, and a second black-image time period, the stereoscopic image displaying method comprising: performing a data providing step to provide a first image data to display a first image in the first time period by scanning, to provide a first black-image data to display a first black-image in the first black-image time period by scanning, to provide a second image data to display a second image in the second time period by scanning, and to provide a second black-image data to display a second black-image in the second black-image time period by scanning; and performing a polarization adjusting step to render the first image and the first black-image to have a first polarization state in the first time period and in the first black-image time period, and to render the second image and the second black-image to have a second polarization state in the second time period and in the second black-image time period, wherein a polarization direction in the first polarization state is orthogonal to a polarization direction in the second polarization state, wherein the data providing step displays the first image, the first black-image, the second image, and the second black-image on a display panel, the polarization adjusting step is performed with a light modulation device, and the light modulation device is disposed in front of the display panel.

6. The stereoscopic image displaying method of claim 5, further comprising providing a backlight in all of the first time period, the first black-image time period, the second time period, and the second black-image time period.

7. The stereoscopic image displaying method of claim 5, wherein the polarization adjusting step and the data providing step are performed by scanning synchronously.

8. The stereoscopic image displaying method of claim 5, wherein a duration of the first time period, a duration of the first black-image time period, a duration of the second time period, and a duration of the second black-image time period are the same.

9. The stereoscopic image displaying method of claim 5, further comprising observing the first image and the second image with an aid of a pair of polarization glasses which includes a first polarization lens and a second polarization lens, wherein the first polarization lens allows transmission of the first image in the first polarization state and blocks transmission of the second image in the second polarization state, and the second polarization lens allows transmission of the second image in the second polarization state and blocks transmission of the first image in the first polarization state.

10. A stereoscopic display device, configured to sequentially display a plurality of display images, a cycle of each of the display images sequentially comprising a first time period, a first vertical blanking interval, a second time period, and a second vertical blanking interval, the stereoscopic display device comprising: a display panel, having a light-exiting plane and a light-incident plane, wherein the display panel provides a first image data to display a first image in the first time period by scanning, the display panel maintains the first image in the first vertical blanking interval by maintaining the first image data, the display panel provides a second image data to display a second image in the second time period by scanning, and the display panel maintains the second image in the second vertical blanking interval by maintaining the second image data; a light modulation device, disposed at a side of the light-exiting plane of the display panel, wherein the light modulation device renders the first image to have a first polarization state in the first time period and in the first vertical blanking interval, and the light modulation device renders the second image to have a second polarization state in the second time period and in the second vertical blanking interval, wherein the light modulation device is disposed in front of the display panel; and a backlight module, disposed at a side of the light-incident plane of the display panel, wherein the backlight module provides a first backlight mode in a period of time within the first time period which starts from a beginning of the first time period and in a period of time within the second time period which starts from a beginning of the second time period, and the backlight module provides a second backlight mode in a remaining period of time within the first time period, in the first vertical blanking interval, in a remaining period of time within the second time period, and in the second vertical blanking interval, and a brightness of the second backlight mode is greater than a brightness of the first backlight mode.

11. The stereoscopic display device of claim 10, wherein the backlight module is turned off in the first backlight mode, and the backlight module is turned on in the second backlight mode.

12. The stereoscopic display device of claim 10, wherein a polarization direction in the first polarization state is orthogonal to a polarization direction in the second polarization state.

13. The stereoscopic display device of claim 10, further comprising a pair of polarization glasses which includes a first polarization lens and a second polarization lens, wherein the first polarization lens allows transmission of the first image in the first polarization state and blocks transmission of the second image data in the second polarization state, and the second polarization lens allows transmission of the second image data in the second polarization state and blocks transmission of the first image in the first polarization state.

14. A stereoscopic display device, configured to sequentially display a plurality of display images, a cycle of each of the display images sequentially comprising a first time period, a first black-image time period, a second time period, and a second black-image time period, the stereoscopic display device comprising: a display panel, having a light-exiting plane and a light-incident plane, wherein the display panel provides a first image data to display a first image in the first time period by scanning, the display panel provides a first black-image data to display a first black-image in the first black-image time period by scanning, the display panel provides a second image data to display a second image in the second time period by scanning, and the display panel provides a second black-image data to display a second black-image in the second black-image time period by scanning; and a light modulation device, disposed at a side of the light-exiting plane of the display panel, wherein the light modulation device renders the first image and the first black-image to have a first polarization state in the first time period and in the first black-image time period, and the light modulation device renders the second image and the second black-image to have a second polarization state in the second time period and in the second black-image time period, wherein the light modulation device is disposed in front of the display panel, wherein a duration of the first time period, a duration of the first black-image time period, a duration of the second time period, and a duration of the second black-image time period are the same.

15. The stereoscopic display device of claim 14, further comprising a backlight module disposed at a side of the light-incident plane of the display panel, wherein the backlight module provides a backlight in all of the first time period, the first black-image time period, the second time period, and the second black-image time period.

16. The stereoscopic display device of claim 14, wherein the light modulation device is scanning synchronously with the display panel.

17. The stereoscopic display device of claim 14, wherein a polarization direction in the first polarization state is orthogonal to a polarization direction in the second polarization state.

18. The stereoscopic display device of claim 14, further comprising a pair of polarization glasses which includes a first polarization lens and a second polarization lens, wherein the first polarization lens allows transmission of the first image in the first polarization state and blocks transmission of the second image in the second polarization state, and the second polarization lens allows transmission of the second image in the second polarization state and blocks transmission of the first image in the first polarization state.

* * * * *